INVENTORS.
Thomas O. Cox.
BY Homer C. Rankin.
Samuel A. Trott.

ATTORNEY.

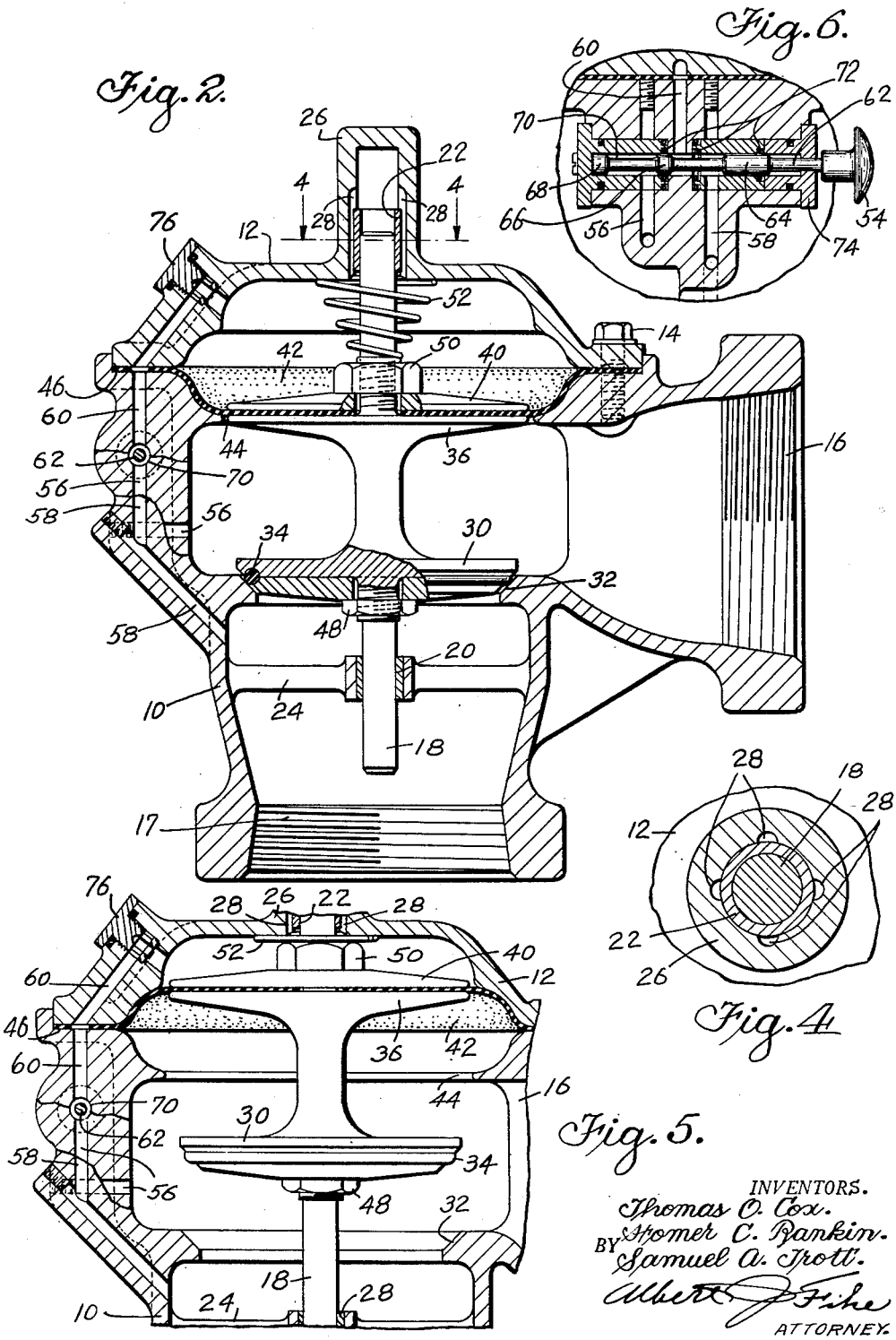

2,698,729

TWO-WAY PILOT CONTROLLED DIAPHRAGM VALVE

Thomas O. Cox, Burbank, Homer C. Rankin, North Hollywood, and Samuel A. Trott, Long Beach, Calif., assignors, by mesne assignments, to Tracy S. Ansel, Wichita, Kans.

Application July 10, 1950, Serial No. 172,893

1 Claim. (Cl. 251—25)

This invention relates to an improved two-way pilot controlled diaphragm valve and has for one of its principal objects the provision of a diaphragm operated valve, which diaphragm can be moved from valve opening to closing position and vice versa simply by shifting the fluid pressure inside the valve, and this movement can be controlled over a wide range of time.

One of the important objects of this invention is the provision of a diaphragm controlled valve wherein the area of the diaphragm is considerably greater than the area of the valve-seat itself whereby the shifting of fluid pressure from one face of the diaphragm to the other will act to close or open the valve regardless of the amount of pressure on either the diaphragm or the valve at the time.

Another important object of the invention resides in the provision of a fluid control valve wherein the flow of fluid through the same can be in either direction without in any way affecting the control thereof.

A further object is the provision of a safety means whereby the valve can be so installed that it will automatically hold either open or shut in the event of breakage or failure of the diaphragm.

Another and still further important object of this invention is the provision, in a two way diaphragm operated control valve, of a simplified construction wherein the diaphragm itself is never subjected to any considerable pressure for an appreciable length of time whereby a more satisfactory and longer lasting construction is achieved.

Yet another object includes the provision of a simple yet effective shifting means for the fluid pressure control which is readily operated, always effective and not likely to get out of order.

Other and further important objects of the invention will be apparent from the disclosures in the accompanying drawings and following specification.

The invention, in a preferred form, is illustrated in the drawings and hereinafter more fully described.

In the drawings:

Figure 2 is a vertical sectional view taken on the line 2—2 of Figure 1 looking in the direction indicated by the arrows.

Figure 4 is a horizontal section taken on the line 4—4 of Figure 2.

Figure 5 is a partial section somewhat similar to Figure 2 but showing the valve in an open position as distinguished from the closed position of Figure 2.

Figure 6 is a detail sectional view somewhat similar to the showing of Figure 3 but illustrating the manual control means as shifted to valve opening position as distinguished from the valve closing position illustrated in Figure 3.

As shown in the drawings:

Figure 1:
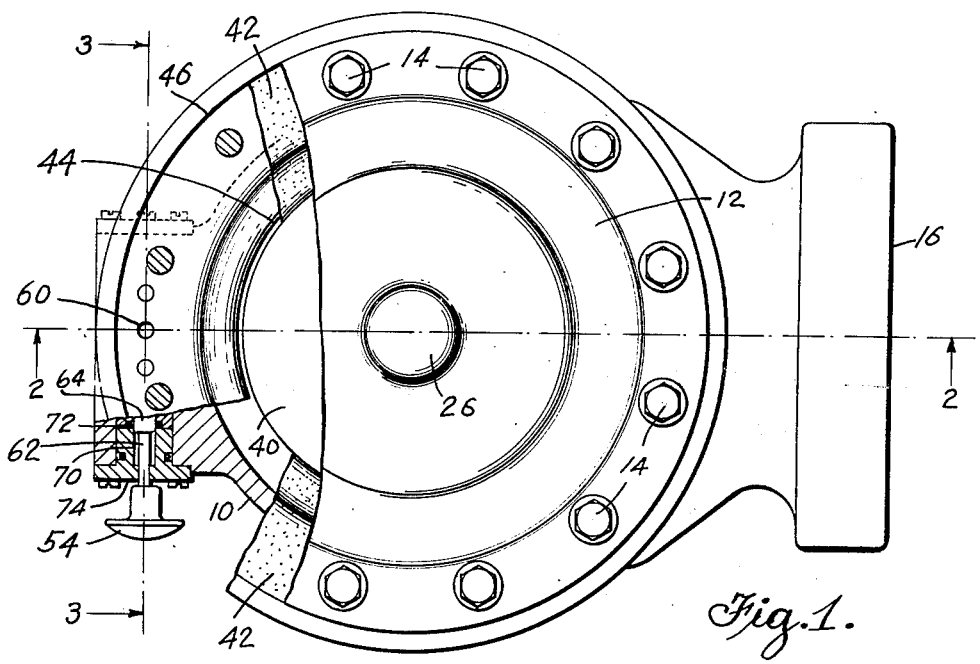
Figure 1 is a top plan view of the improved two-way control valve of this invention, parts being broken away to show certain features of the interior construction.

The reference numeral 10 indicates the body or casing of the improved two-way pilot controlled diaphragm valve of this invention, the same having a top plate or cover 12 which is removably fastened to the body by means of bolts or the like 14.

The body is provided with a side opening 16 and bottom opening 17 whereby flow of liquid or fluid therethrough is permitted. These openings are preferably internally screw threaded to provide for ready installation in a pipe line or the like.

A central stem 18 is mounted in suitable bushings or bearings 20 and 22 in the body and cover, the lower bushing 20 being preferably formed as part of a web or other support 24 integral with or positioned in the body 10.

The upper bushing 22 is preferably positioned in a cylindrical extension 26 of the cover 12 and, as best shown in Figures 2 and 4, a plurality of slots or openings 28 is provided in the cylinder 26 outside of the bushing 22 whereby any trapping of fluid or the like in the space in the cylinder 26 above the upper end of the stem or shaft 18 is avoided.

Mounted on the shaft or stem 18 is a valve element 30 which fits against a valve seat 32 formed in the body 10 and a gasket or other sealing element 34 is preferably incorporated into the face of the valve 30 whereby better sealing effect is accomplished. Also mounted on the shaft or stem 18 is a diaphragm supporting plate 36 which, as shown, is integral with the upper portion of the valve 30 but may be made as a separate structure so long as the desired and necessary spacing and cooperative action of the parts is provided.

Mounted on the shaft or stem 18 and in juxtaposition with the plate 36 is a cooperating plate or disk 40 which is for the purpose of securely maintaining a diaphragm 42 in desired position between the two plates and with respect to an opening 44 formed in the body 10.

It will be noted that the overall area of the diaphragm support 36—40 is considerably greater than the area of the valve 30 whereby the amount of pressure inside the valve body will always be greater on the diaphragm support than on the valve.

The outer edge of the diaphragm 42 is supported beneath the periphery of the cover 12 where it fits into a preformed seat 46 in the upper face of the body 10 and the bolts 14 provide a secure fluid tight fit and support.

A nut 48 is provided for maintaining the valve 30 in assembled position and a nut 50 performs the same function with regard to the diaphragm support 36—40.

A spiral helical spring 52 surrounds the upper end of the shaft or stem 18 and surmounts the locking nut 50 being positioned between the top of this nut and underface of the cover 12. The structure of this spring is such that when the valve and diaphragm holder are in raised position, it is practically flat as best shown in Figure 5. This spring can be omitted, but provides a better valve closing action by overcoming any small amount of friction which may develop in the bearings. It also tends to produce a more uniform diaphragm action. The diaphragm itself offers substantially no resistance to movement in any position.

Means are provided for controlling the fluid pressure on the faces 36 and 40 of the diaphragm holder, such means comprising essentially a series of conduits or passageways, the action of which is controlled by means of a push button or the like 54.

One of the passages is shown at 56 and leads from the space between the upper face of the valve 30 and the lower face 36 of the diaphragm holder to the control means. Another duct or passageway 58 connects the control means to the space beneath the valve 30 and a third duct 60 leads from the control element to the space above the diaphragm 42.

The control means operated by the push button 54 includes essentially a stem 62 having integral enlargements along its length, these being indicated by the reference numerals 64, 66 and 68. The stem, with its enlargements, is adapted to slidably fit into a lateral passageway 70 which joins all of the ducts 56, 58 and 60. Suitable gaskets or sealing elements 72 are provided adjacent the passageway so that a fluid tight relationship is always maintained between the enlargements 64, 66 and 68 and the inner faces of the passageway 70. A packing gland 74 seals the stem and its attachments into its conduit or cylinder 70.

Figure 3:
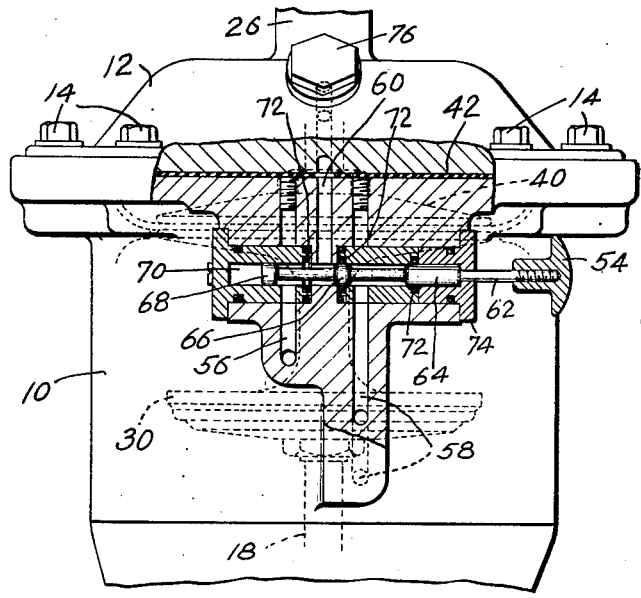
Figure 3 is a vertical section taken on the line 3—3 of Figure 1 looking in the direction indicated.

When the operating or control button 54 is in the position shown in Figure 3, fluid or liquid from the space above the valve 30 will flow into the passage or duct 56, past the stem 62 and between its protuberances 68 and 66 into the passageway 60 and thence to the space above the diaphragm 42. The pressure of the fluid or liquid will be greater on the combined upper surfaces of the valve 30 and the diaphragm holder plate 40 than it is on the lower face of the diaphragm holder 36, whereupon the valve will remain in closed position as shown in Figure 2.

However, when the control button 54 and the stem 62 are moved into the position shown in Figure 6, the duct 56 will be sealed off and an open passageway will be provided connecting the duct 58 to the duct 60 which leads to the space above the diaphragm. In this position, there will be practically no fluid pressure on the top of the diaphragm inasmuch as fluid or liquid can readily flow through the duct 60, the connection provided by the stem 62 and the duct 58 to the space below the valve 30. This, of course, is assuming that the liquid or fluid under pressure is entering the valve body through the opening 16. Accordingly, the total thrust on the underface 36 of the diaphragm holder will be greater than the total thrust on the upper face of the valve 39, whereupon the valve will be lifted and maintained in open position as shown in Figure 5. This is due to the differential in area.

Obviously, if the fluid or liquid flow through the valve is reversed, thereby making the opening 17 the inlet and the opening 16 the outlet, the converse of the above will be true.

It will be noted that the chamber for supporting the diaphragm 42 in either valve opening or closing position is of a special contour in that there is practically no actual liquid or fluid pressure on an unsupported portion of the diaphragm in either position, except perhaps when a shift is taking place. This provides for a much longer life of the diaphragm itself and also a much more positive valve opening and closing operation.

A pressure adjusting nut or needle valve 76 is mounted in the cover 12 adjacent the passageway 60 and this also provides for a suitable desired drilling of connecting openings to produce this passageway. An important feature of this element is the variable control of the size of the orifice 60 which is provided, thereby making possible an accurate control of the speed of opening or closing of the valve.

In the event of a diaphragm failure or breakage, the construction of this device is such that the valve will automatically be held either open or closed in such emergency, depending upon the installation and the resultant direction of flow therethrough.

It will be evident that herein is provided an extremely positive two-way valve for fluid control with an adjustable rate of operation which can be used to considerable advantage in many fields, wherein the definite control of fast or slow flowing and relatively large or small quantities of fluids and liquids are desired, such as in the aviation, petroleum and chemical industries. However, the device is not, in any way, limited to any particular field, but may be employed to great advantage in numerous environments.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

A two-way pilot controlled diaphragm valve, including a main body having inlet and outlet ports, a cover for the body, a stem shiftably mounted in bearings in the body, a valve seat in the body, a valve on the stem for co-action with the seat, a diaphragm supported on the stem, the diaphragm being of a larger area than the valve, means for variably controlling the rate of operation of the valve, two plates mounted on the stem to support the diaphragm therebetween, either plate itself having a larger area than the area of the valve, the top of the body portion and the inner face of the cover providing a supporting chamber for the flexible portion of the diaphragm and limiting its movement for valve opening and closing position, control means in the body for shifting fluid pressure in the body from one face of the diaphragm to the other, said control means including a second stem slidable in a cylindrical opening in the body, means for operating the second stem, the second stem throughout the greater part of its length being of a lesser diameter than the inner diameter of its containing cylinder and provided with enlargements along its length, which enlargements correspond in external diameter to the internal diameter of the containing cylinder, a plurality of ducts leading from the interior of the valve body to the containing cylinder for the control stem, one of the ducts leading from the space in the body between the valve and the diaphragm holder, another duct leading to the space below the valve and a third duct leading to the space above the diaphragm, and wherein a shifting of the control means and its stem will connect either the space above the valve or the space below the valve with the space above the diaphragm by way of a space between the second stem and its containing cylinder.

References Cited in the file of this patent

UNITED STATES PATENTS

| | | |
|---|---|---|
| 1,180,603 | Perrine | Apr. 25, 1916 |
| 1,474,472 | Gulick | Nov. 20, 1923 |
| 1,579,785 | Rouleau | Apr. 6, 1926 |
| 1,856,889 | Stoetzel | May 3, 1932 |
| 2,180,320 | Hansen | Nov. 14, 1939 |
| 2,235,304 | Toussant | Mar. 18, 1941 |
| 2,328,008 | Griswold | Aug. 31, 1943 |
| 2,524,142 | Seeloff | Oct. 3, 1950 |
| 2,532,568 | Myers | Dec. 5, 1950 |

FOREIGN PATENTS

| | | |
|---|---|---|
| 30,098 | Germany | Jan. 14, 1885 |
| 15,792 | Switzerland | Dec. 15, 1897 |